(12) United States Patent
Sakurai

(10) Patent No.: US 6,220,770 B1
(45) Date of Patent: *Apr. 24, 2001

(54) CAMERA ADAPTED TO USE A FILM CARTRIDGE HAVING A MOVABLE LIGHT SHIELD DOOR

(75) Inventor: Hiroshi Sakurai, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/328,864

(22) Filed: Oct. 26, 1994

(30) Foreign Application Priority Data

Oct. 29, 1993 (JP) .................................................. 5-292482

(51) Int. Cl.⁷ .............................. G03B 17/26; G03B 17/02
(52) U.S. Cl. ........................................... 396/514; 396/538
(58) Field of Search ................................ 354/288, 173.1; 396/513, 514, 516, 536, 537, 538

(56) References Cited

U.S. PATENT DOCUMENTS

| | | | |
|---|---|---|---|
| 4,339,193 | * | 7/1982 | Harvey .................................. 354/288 |
| 4,938,429 | | 7/1990 | Robertson et al. .................. 242/71.1 |
| 5,231,438 | * | 7/1993 | Smart ..................................... 354/281 |
| 5,432,575 | * | 7/1995 | Funahashi ......................... 354/195.1 |
| 5,473,401 | * | 12/1995 | Tsunefuji .............................. 354/288 |
| 5,495,310 | * | 2/1996 | Takatori ................................ 354/288 |
| 5,565,951 | * | 10/1996 | Tokui ..................................... 396/538 |
| 5,754,904 | * | 5/1998 | Izukawa ................................ 396/390 |

FOREIGN PATENT DOCUMENTS

| | | | |
|---|---|---|---|
| 0 545 098 | 6/1993 | (EP) | .............................. G03B/17/30 |
| 1-191836 | 8/1989 | (JP) . | |
| 1-191837 | 8/1989 | (JP) . | |
| 5-150344 | 6/1993 | (JP) . | |

OTHER PUBLICATIONS

Official Communication dated Jan. 29, 1999.
Patent Abstract of Japan, vol. 13, No. 482; (P–953) Nov. 2, 1989.
Patent Abstract of Japan. vol. 17, No. 539; (P–1621) Sep. 28, 1993, Same As Abstract for Doc. 5–150344 Listed Above.

* cited by examiner

Primary Examiner—Russell Adams
Assistant Examiner—Christopher E. Mahoney
(74) Attorney, Agent, or Firm—Fitzpatrick, Cella, Harper & Scinto

(57) ABSTRACT

A camera or apparatus adapted to use an image recording medium cartridge having a cover for allowing an image recording medium to exit from or withdraw into the image recording medium cartridge, or a device adapted in the camera or apparatus, includes inhibition means for inhibiting the cartridge from being unloaded from the camera or apparatus when the cover of the cartridge loaded in the camera or apparatus is open, and disabling means for disabling an operation of the inhibition means when the cover of the cartridge loaded in the camera or apparatus is open.

64 Claims, 5 Drawing Sheets

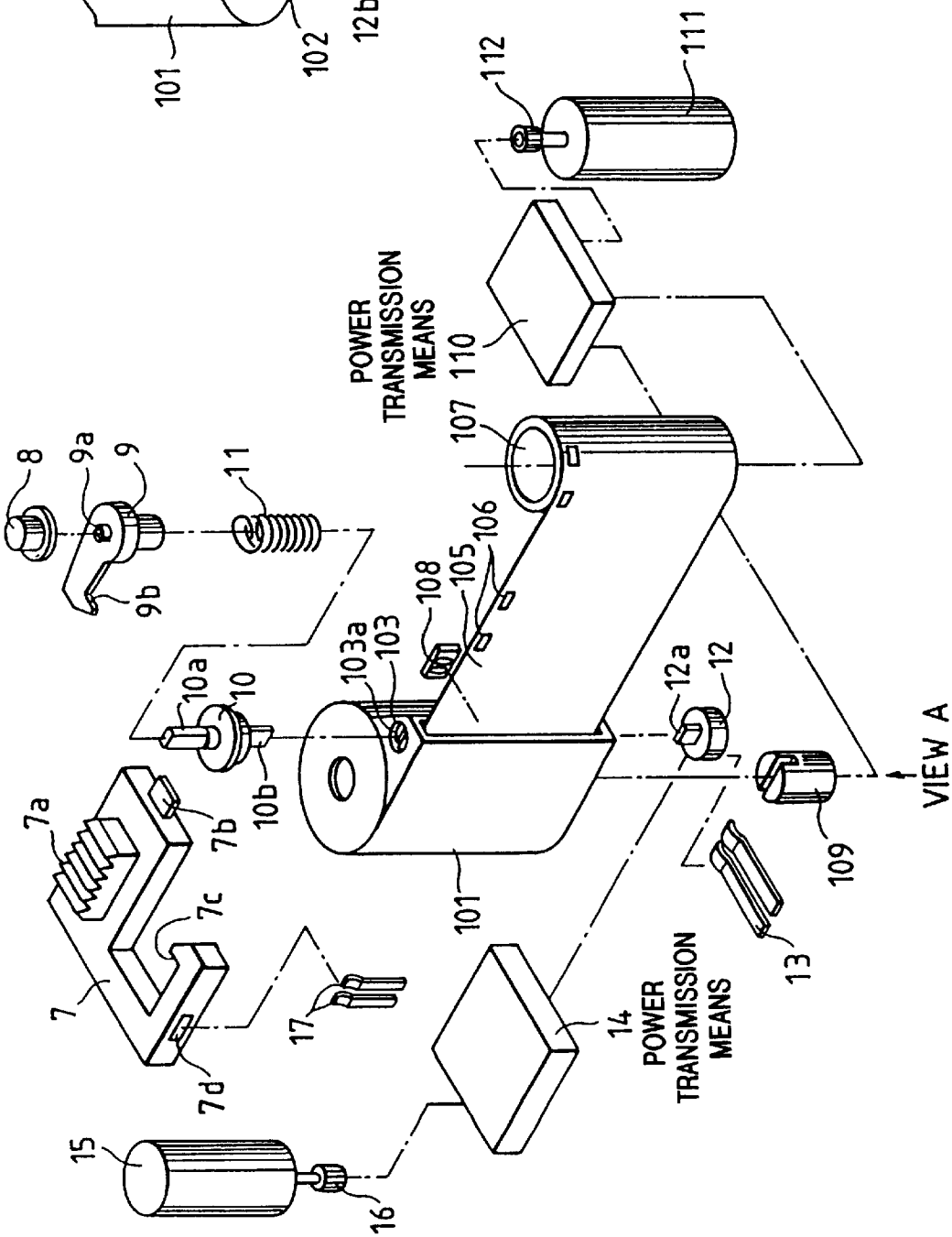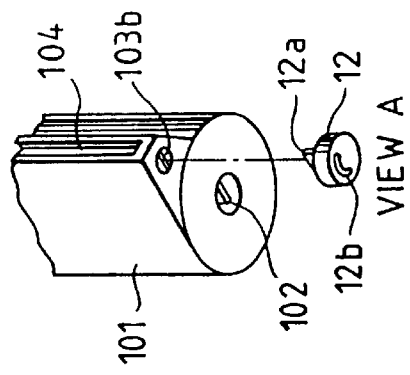

CAMERA ADAPTED TO USE A FILM CARTRIDGE HAVING A MOVABLE LIGHT SHIELD DOOR

BACKGROUND OF THE INVENTION

1. Field of the Invention

The present invention relates to an improvement in a camera adapted to use a film cartridge having a movable light shield door.

2. Related Background Art

Cameras each having a movable light shield door opening/closing device for opening/closing a movable light shield door formed on a film cartridge are disclosed in Japanese Laid-Open Patent Application Nos. 1-191836 and 1-191837. In these prior arts, when a switch for detecting if a cartridge chamber cover is closed detects that the cartridge chamber cover is closed, a movable light shield door is opened, and a film is extracted via the movable light shield door to prevent film exposure. After a predetermined period of time has elapsed from the end of the rewind operation of a film, if the movable light shield door remains open, an alarm is generated. Furthermore, the prior art describes an embodiment which prevents inadvertent exposure of a film by inhibiting the cartridge chamber cover from being opened when the movable light shield door is open.

A movable light shield door is also disclosed in U.S. Pat. No. 4,938,429. In this reference, a light shield door is opened/closed by pivoting a rotatable shaft.

In the above-mentioned prior arts, an operation member for opening/closing the cartridge chamber cover of a camera is locked while the movable light shield door is open. A lock member for locking the operation member is operated integrally with the movable light shield door by the driving force from a motor. In this arrangement, if the movable light shield door cannot be mechanically closed due to some accident (for example, the motor is locked or a film portion is extracted from a cartridge), the lock member cannot be operated even if the lock member can be forcibly externally operated.

Therefore, in the above-mentioned prior art, when the movable light shield door cannot be closed due to some accident, the cartridge chamber cover of the camera can never be opened, and the film cartridge cannot be unloaded.

SUMMARY OF THE INVENTION

One aspect of the present invention is to provide a camera or apparatus adapted to use an image recording medium cartridge having a cover for allowing an image recording medium to exit from or withdraw into the image recording medium cartridge, or a device adapted in the camera or apparatus, which camera or apparatus comprises inhibition means for inhibiting the cartridge from being unloaded from the camera or apparatus cartridge loaded in the camera or apparatus is open, and disabling means for disabling an operation of the inhibition means when the cover of the cartridge loaded in the camera or apparatus is open, which camera or apparatus allows the cartridge to be unloaded from the camera or apparatus even when the cover of the cartridge loaded in the camera or apparatus is kept open and cannot be closed due to some accident.

Other aspects of the present invention will become apparent from the following description of the preferred embodiments.

BRIEF DESCRIPTION OF THE DRAWINGS

FIGS. 2A and 2B are perspective views showing the mechanical arrangements of principal portions of the camera shown in FIG. 1;

DETAILED DESCRIPTION OF THE PREFERRED EMBODIMENTS

The embodiments of the present invention will be described below with reference to the accompanying drawings.

Figure 1:
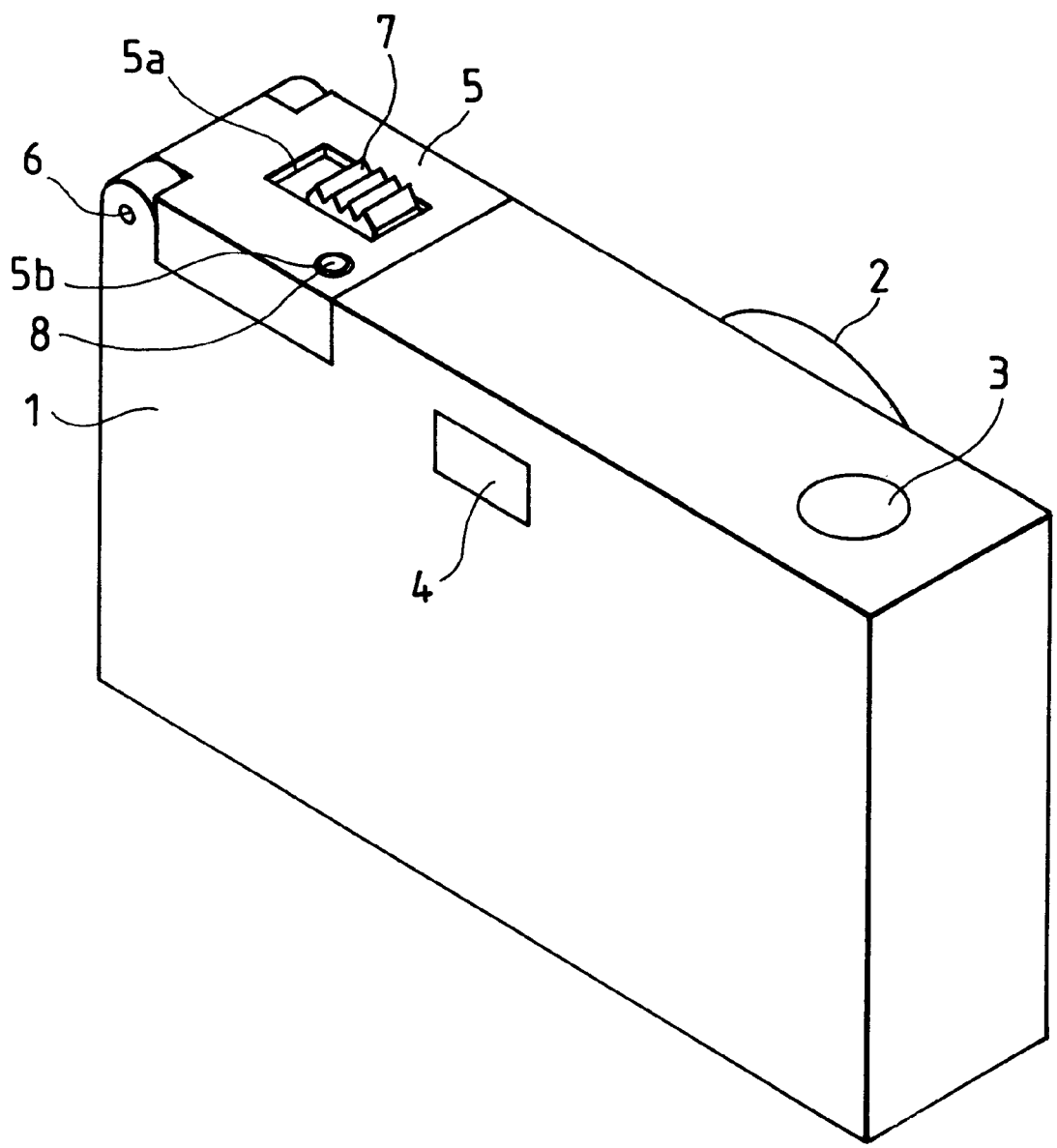
FIG. 1 is a perspective view showing the outer appearance of a camera according to the first embodiment of the present invention.

FIGS. 1 to 4B show the first embodiment of the present invention, and FIG. 1 is a perspective view showing the outer appearance of a camera according to the first embodiment of the present invention.

Referring to FIG. 1, the camera includes a camera main body 1, a phototaking lens 2, a shutter button 3, a view finder 4, a cartridge chamber cover 5 which opens/closes a cartridge chamber arranged in the camera main body 1 and allows loading/unloading of a film cartridge (to be described later), and a hinge shaft 6 which rotatably couples the cartridge chamber cover 5 to the camera main body 1, and allows opening/closing of the cartridge chamber. The camera also includes an operation member 7 for opening/closing the cartridge chamber cover 5, and a release button 8 for releasing a locked state of the operation member 7 in an emergency state. Furthermore, the camera includes a notch 5a for allowing the operation member 7 to be slidable, and a hole 5b for operating the release button 8.

FIGS. 2A and 2B are perspective views showing the mechanical arrangements of principal portions of the camera.

Referring to FIGS. 2A and 2B, the camera includes a film cartridge 101 which is loaded in the cartridge chamber in the camera main body 1 and stores a film, a shaft 102 used for feeding a film in the film cartridge 101, and an engaging portion 103 for opening/closing a movable light shield door of the film cartridge 101. The engaging portion 103 integrally has engaging grooves 103a and 103b at the two end portions of the film cartridge 101. The camera also includes a movable light shield door 104 for opening/closing a film exit/entrance opening of the film cartridge 101, a film 105 with perforations 106, a spool 107 for taking up the film 105, and a photoreflector 108 for detecting the perforations 106 of the film 105. The camera further includes a power transmission fork 109 which is engaged with the film feed shaft 102 in the loaded film cartridge 101 to feed (push out) the film 105 from the film cartridge 101 or to rewind the film. Moreover, the camera includes a power transmission mechanism 110 for transmitting power to the fork 109 and the take-up spool 107, a film feed motor 111, and an output gear 112, of the film feed motor 111, for transmitting the output from the film feed motor 111 to the power transmission mechanism 110.

The operation member 7, which is partially shown in FIG. 1, is constituted by the following members 7a to 7d (the cartridge chamber cover 5 is not shown in FIGS. 2A and 2B).

That is, the operation member 7 is constituted by an operation portion 7a, a pawl portion 7b which is engaged with an engaging portion (not shown) provided to the camera main body 1 to hold the cartridge chamber cover 5 in a closed state, a lock portion 7c for locking the operation member 7 in an inoperable state, and an electrical contact 7d on the operation member 7. When the operation member 7 is operated by moving it in a direction to close the cartridge chamber cover 5, the electrical contact 7d is electrically connected to a cartridge chamber cover opening/closing detection switch 17, i.e., the cartridge chamber cover opening/closing detection switch 17 is turned on.

A lock member 9 is used for setting the operation member 7 in an inoperable state, and has a flat round hole 9a and a lock pawl 9b to be engaged with the lock portion 7c of the operation member 7. A driven member 10 is engaged with the engaging portion 103 provided to the film cartridge 101, and has a flat round engaging portion 10a which is engaged with the flat round hole 9a of the lock member 9, and an engaging pawl 10b which is engaged with the engaging groove 103a of the engaging portion 103.

A spring 11 is arranged between the lock member 9 and the driven member 10 to push up the lock member 9 from the lower side and to push down the driven member 10 from the upper side. When the release button 8 is depressed, the lock member 9 can be swung in the vertical direction upon operation of the spring 11. Even when the engaging pawl 10b of the driven member 10 cannot be satisfactorily engaged with the engaging groove 103a of the engaging portion 103, the discrepancy can be absorbed by the spring 11, and later, the engaging pawl 10b can be satisfactorily engaged with the engaging groove 103a upon pivotal movement of the movable light shield door 104.

A driving member 12 is engaged with the engaging portion 103, and has an engaging pawl 12a to be engaged with the engaging groove 103b and an electrical contact 12b arranged on a circumference having the rotational shaft of the driving member 12 as the center. A movable light shield door opening/closing detection switch 13 is electrically connected to the electrical contact 12b of the driving member 12, i.e., is turned on when the movable light shield door 104 is open while the film 105 is extracted from the film cartridge 101, as shown in FIG. 2A (in FIG. 2B, the movable light shield door 104 is closed).

A power transmission mechanism 14 is used for driving the driving member 12. A motor 15 opens/closes the movable light shield door via an output gear 16 for transmitting an output from the movable light shield door opening/closing motor 15 to the power transmission mechanism 14.

Figure 3A:
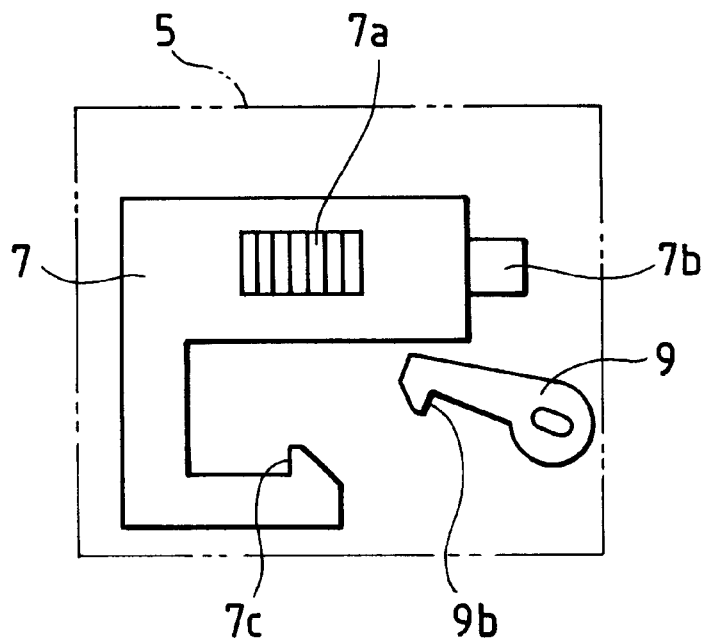
FIGS. 3A and 3B are plan views showing a state wherein an operation member shown in FIG. 1 is operated.
Figure 3B:
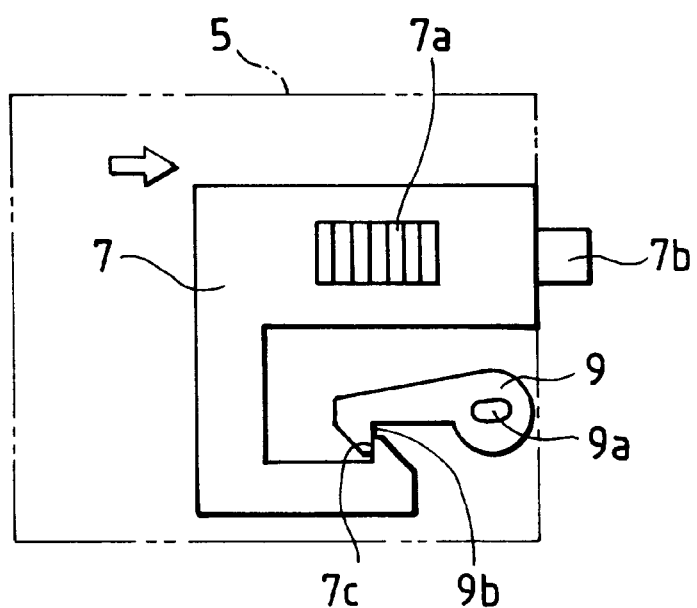

FIGS. 3A and 3B are plan views showing a state wherein the operation member 7 is operated.

FIG. 3A shows a state wherein the cartridge chamber cover 5 can be opened. In this state, the operation member 7 is located at a position where the cartridge chamber cover 5 can be opened about the hinge shaft 6 shown in FIG. 1, and the lock member 9 is located at a position where the movable light shield door 104 is closed.

FIG. 3B shows a state wherein the cartridge chamber cover 5 is closed. When the operation portion 7a of the operation member 7 is slid in the direction of an arrow in FIG. 3B, the pawl portion 7b is engaged with the engaging portion (not shown) provided to the camera main body 1, and the cartridge chamber cover 5 is held in a closed state.

When the cartridge chamber cover 5 is closed, as described above, the cartridge chamber cover opening/closing detection switch 17 shown in FIGS. 2A and 2B is turned on, and the movable light shield door opening/closing motor 15 is started by a motor control circuit (not shown), thereby opening the movable light shield door 104 via the driving member 12. At this time, the engaging pawl 10b of the driven member 10, which is engaged with the engaging groove 103a of the engaging portion 103 is pivoted counterclockwise to follow the movement of the movable light shield door 104. Then, the pivot force is transmitted to the flat round hole 9a coaxially engaged with the flat round engaging protion 10a, and the lock member 9 is pivoted counterclockwise. With this operation, the lock pawl 9b is engaged with the lock portion 7c, and locks the operation member 7 at a position for inhibiting the cartridge chamber cover 5 from being opened, so that the film 105 in the loaded film cartridge 101 can be prevented from being inadvertently exposed by opening the cartridge chamber cover 5 (see FIG. 3B).

Figure 4A:
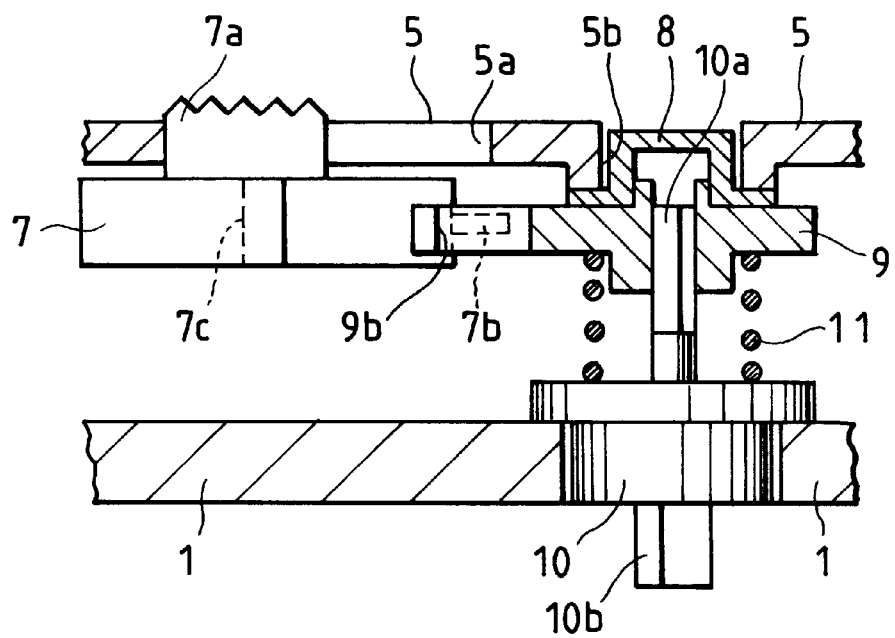
FIGS. 4A and 4B are sectional views showing a state wherein the operation member shown in FIG. 1 is operated.
Figure 4B:
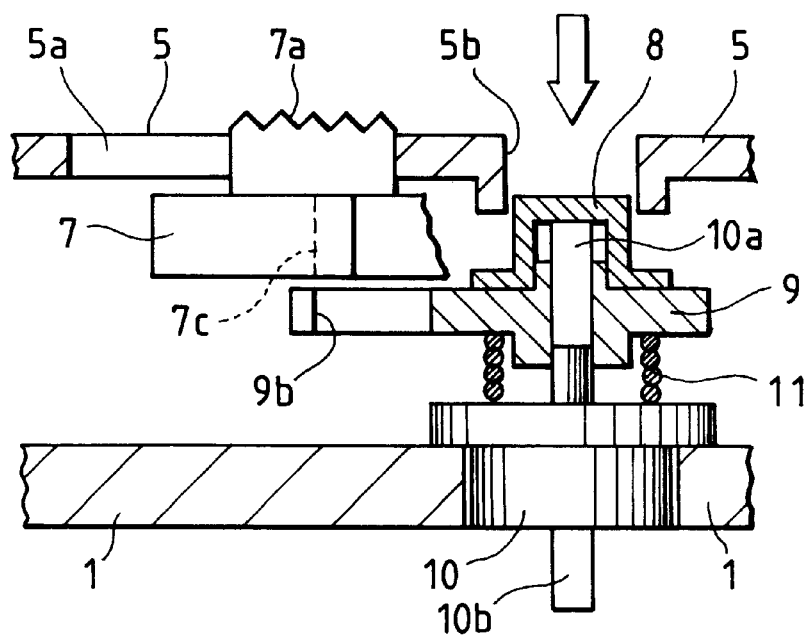

FIGS. 4A and 4B are sectional views showing a state wherein the operation member 7 is operated.

FIG. 4A corresponds to the state shown in FIG. 3A, and shows a state wherein the cartridge chamber cover 5 is openable. In this state, the release button 8 is not depressed, and the lock member 9 is pushed upward by the spring 11. Note that the release button 8 is preferably arranged at a level equal to or lower than that of the surface of the cartridge chamber cover 5 so as not to be inadvertently operated (depressed) in a state other than an emergency state, thus preventing inadvertent exposure.

When the operation member 7 is slid in the direction to hold the closed state of the cartridge chamber cover 5 from the state shown in FIG. 4A, the movable light shield door 104 is opened, and the driven member 10 and the lock member 9 are pivoted to follow the movement of the door. The lock pawl 9b is engaged with the lock portion 7c to lock the operation member 7 at a position for inhibiting the cartridge chamber cover 5 from being opened, as described above. In this state, as shown in FIG. 4B, when an emergency has occurred such that the movable light shield door will not be closed due to some accident and the film cartridge 101 cannot be extracted, the release button 8 is depressed in the direction of an arrow in FIG. 4B, so that the lock member 9 is pushed down integrally with the release button 8 against the biasing force of the spring 11, the lock pawl 9b is moved in the thickness direction of the lock portion 7c, and the engagement between the lock pawl 9b and the lock portion 7c is released.

In this state, the operation member 7 becomes operable, and the cartridge chamber cover 5 can be opened to extract the film cartridge 101 by sliding the operation member 7 in a direction to open the cartridge chamber cover 5.

In the first embodiment, the release button 8 and the lock member 9 are separately arranged but may be integrally arranged. If the lock member 9 or the driven member 10 is provided with a weak spring for biasing in the clockwise direction, the engaging pawl 10b can be reliably engaged with the engaging groove 103a of the engaging portion 103 when the movable light shield door 104 is closed.

The second embodiment of the present invention will be described below.

Figure 5:
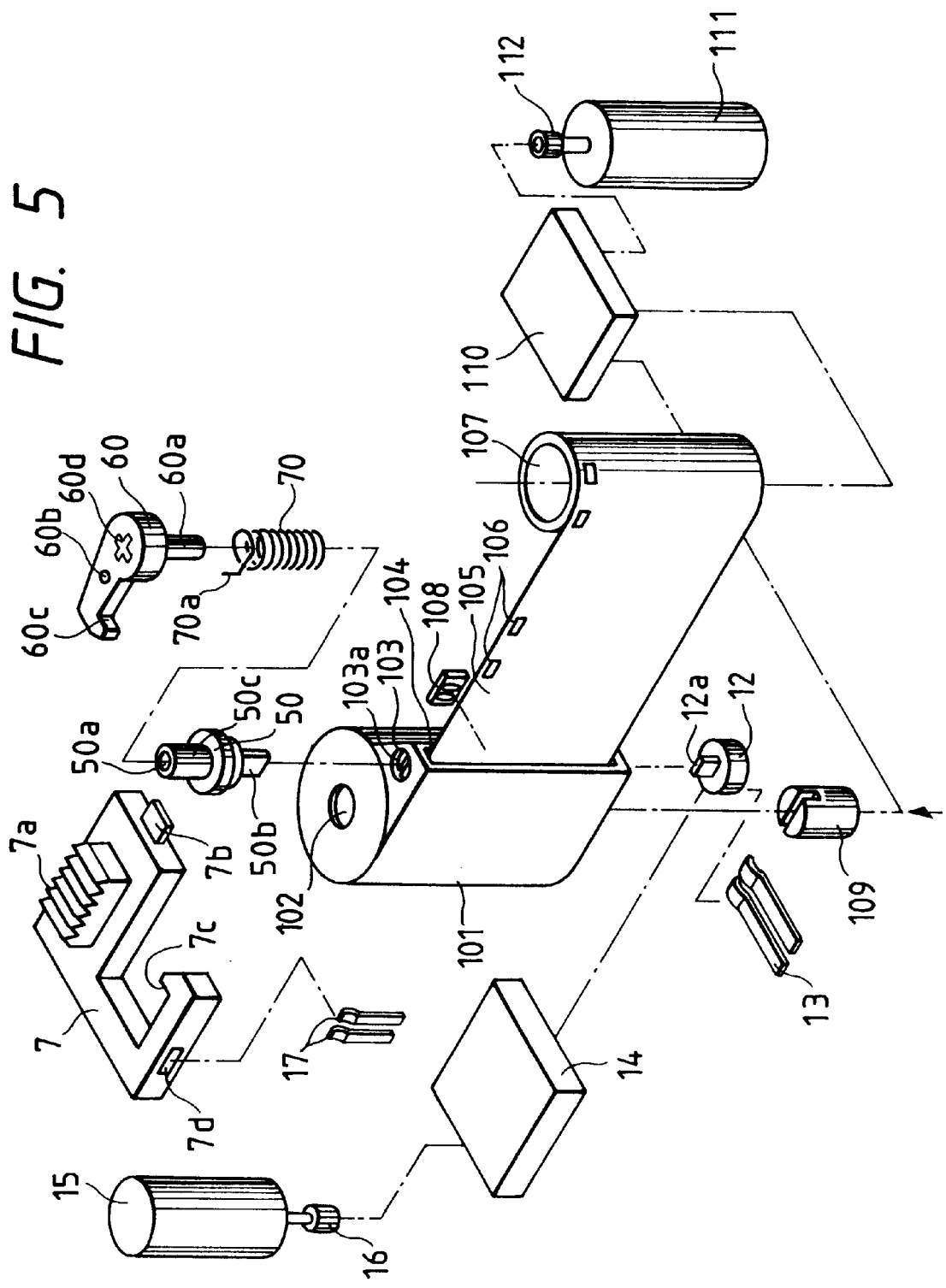
FIG. 5 is a perspective view showing the mechanical arrangement of principal portions of a camera according to the second embodiment of the present invention.

FIG. 5 is a perspective view showing the mechanical arrangement of principal portions of a camera according to the second embodiment of the present invention, and the same reference numerals in FIG. 5 denote the same parts as in FIGS. 2A and 2B.

In the first embodiment, the locked state is released by depressing the lock release mechanism (the release button 8 and the lock member 9) in the thickness direction. However, in the second embodiment, the locked state is released by rotating the lock release mechanism clockwise.

Referring to FIG. 5, a driven member 50 of the engaging portion 103 has an engaging hole 50a to be pivotally engaged with a lock member (to be described later), an engaging pawl portion 50b to be engaged with the engaging groove 103a of the engaging portion 103, and a friction surface 50c to which a friction spring (to be described later) is attached. A lock member 60 is used for locking the operation member 7 in an inoperable state. The lock member 60 has an engaging shaft 60a to be pivotally engaged with the engaging hole 50a of the driven member 50, a locking hole 60b for locking one end of a friction spring (to be described later), a lock pawl 60c to be engaged with the lock portion 7c of the operation member 7, and a groove 60d capable of receiving a "plus" (Phillips head) screwdriver to allow, e.g., the plus screwdriver to pivot the lock member 60 in only an emergency state. A clockwise friction spring 70 has an engaging portion 70a at which the friction spring 70 is locked.

The operation of the lock release mechanism with the above arrangement will be described below.

When the movable light shield door 104 is opened, the driven member 50, which is engaged with the engaging portion 103, is pivoted counterclockwise. At this time, since the friction spring 70 has a clockwise turn, which corresponds to a loosening direction with respect to the driven member 50, the driven member 50 and the friction member 70 are rotated idle. However, since the driven member 50 and the friction spring 70 generate, therebetween, a friction large enough to pivot the lock member 60, the lock member 60 is rotated counterclockwise as is the driven member 50. In this state, the lock pawl 60c of the lock member 60 is engaged with the lock portion 7c to lock the operation member 7 at a position for inhibiting the cartridge chamber cover 5 from being opened.

When the movable light shield door 104 is closed, the driven member 50 is pivoted clockwise. At this time, the friction spring has a fastening direction with respect to the driven member 50, and the lock member 60 is integrally pivoted clockwise, thus setting the operation member 7 in an operable state.

When the movable light shield door 104 cannot be closed from an open state due to some accident, a plus screwdriver may be inserted in the groove 60d of the lock member 60 and pivoted clockwise. Since the movable light shield door 104 is not closed due to the interference of the film 105 present at the film port, the driven member 50 and the friction spring 70 slip, and only the lock member 60 is pivoted clockwise, thus allowing the operation member 7 to be operable. As a result, the cartridge chamber cover 5 can be opened. In this case, since the friction spring 70 is pivoted in a direction to release spring bias or tension, the movable light shield door 104 will not strongly push the film 105 even if it bites the film 105, thus preventing the film 105 from being damaged.

Note that the groove 60d is a groove capable of receiving a plus screwdriver. However, the groove 60d may be any other grooves such as a "minus" (flat head) groove, an L-groove, and the like as long as the lock member 60 can be externally pivoted. Alternately, in place of a groove, a projection may be formed. That is, the groove 60d need only have a shape which prevents inadvertent operation, and thereby prevents inadvertent exposure in a state other than an emergency state.

According to each of the above embodiments, upon loading the film cartridge 101, a driving system for driving the engaging groove 103b is arranged at an engaging groove 103b side of the engaging grooves 103a and 103b at the two end portions of the film cartridge 101, and the lock members 9 and 60 driven by the engaging groove 103a are arranged at the engaging groove 103a side. For this reason, a mechanism having a relationship between the driving and driven sides properly utilizing the engaging grooves 103a and 103b at the two end portions of the film cartridge 101 can be arranged with a high space efficiency and a high degree of design freedom. Note that an arrangement mechanism other than lock members 9 and 60 may be arranged at the driven side to perform a predetermined operation.

Even when the movable light shield door 104 cannot be closed, the operation member 7 for opening/closing the cartridge chamber cover 5 can be operated by the lock release means (the release button 8 or the groove 60d capable of receiving a plus screwdriver) of the lock member 9 or 60. For this reason, if this operation is performed in, e.g., a dark room, the film cartridge 101 can be unloaded from the camera main body 1 without exposing the film 105.

In the present invention, operations to be manually performed in each of the above embodiments may be realized electrically.

In the present invention, the above embodiments or their technical elements may be combined as needed.

The present invention can be applied to a device which uses a cartridge having a movable light shield door or the like, which has a shape other than that described in the above specification.

The present invention can be applied to image recording media other than a film.

The present invention can be applied to a device which uses a cartridge of a type other than that described in the above specification, a cartridge having an image recording medium other than a film, various other cartridges, and a member to be loaded other than a cartridge.

In the present invention, all or some of the constituent elements of the claims or embodiments may constitute a single device, a device to be combined with another device, or an element constituting a device.

The present invention can be applied to various types of cameras such as a single-lens reflex camera, a lens shutter camera, a video camera, and the like, optical equipment or apparatuses other than a camera, a device adopted in these cameras, optical equipment, or apparatuses, or an element constituting these.

The individual components shown in schematic or block form in the drawings are all well-known in the camera arts and their specific construction and operation are not critical to the operation or best mode carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera adapted to use a cartridge including an image recording medium, the cartridge having a cartridge cover that opens and closes to permit the image recording medium to exit from and withdraw into the cartridge, the camera comprising:

operation means for causing the cartridge cover of a cartridge loaded in the camera to open to an open state;

inhibition means for selectively inhibiting an unloading operation of the cartridge from the camera;

actuation means operable in a first state, in which operation of said actuation means simultaneously actuates said operation means to cause the cartridge cover to open to the open state and actuates said inhibition means to inhibit an unloading operation of the cartridge from the camera, and operable in a second state, in which such operation of said actuation means does not actuate said inhibition means; and state selection means for selecting operation of said actuation means in the first state or the second state.

2. A camera according to claim 1, wherein the image recording medium comprises a film.

3. A camera according to claim 1, wherein said inhibition means comprises means for inhibiting an opening operation of a camera body cover which allows the cartridge to be unloaded from the camera.

4. A camera according to claim 1, wherein said inhibition means comprises release means for releasing an operation of said inhibition means in connection with a closing operation of the cartridge cover of a cartridge loaded in the camera.

5. A camera according to claim 1, wherein said inhibition means comprises bias means for biasing said state selection means to select operation of said actuation means in the first state.

6. A camera according to claim 5, wherein said bias means includes a spring for biasing said disabling means in an inoperative state.

7. A camera according to claim 1, wherein the cartridge includes a first operation portion and a second operation portion functionally connected with the cartridge cover of the cartridge, the camera further comprising:

driving means for driving the first operation portion to selectively perform one of an opening operation and a closing operation of the cartridge cover of the cartridge, whereby a driving operation of said first operation portion by said driving means so as to selectively perform one of an opening operation and a closing operation of the cartridge cover of the cartridge thereby also causes a driving operation of the second operation portion so as to selectively perform one of an inhibiting operation and a release operation of the inhibition means, respectively.

8. A camera adapted to use a cartridge including an image recording medium, the cartridge having a cartridge cover and first and second operation portions functionally connected with respective ends of the cartridge cover, the camera comprising:

driving means for driving the first operation portion to selectively perform one of an opening operation and a closing operation of the cartridge cover of the cartridge;

inhibition means operable in a first state, for inhibiting at least one of a loading operation of a cartridge into the camera and an unloading operation of the cartridge from the camera, and operable in a second state, in which said inhibition means does not inhibit a loading operation or an unloading operation of the cartridge; and operation means, functionally connectable to said second operation portion, for performing a changeover operation between the first state and the second state of said inhibition means, whereby a driving operation of said first operation portion by said driving means so as to selectively perform one of an opening operation and a closing operation of the cartridge cover of the cartridge thereby also causes a driving operation of the second operation portion so as to selectively perform a changeover operation between the first state and the second state of said inhibition means, respectively.

9. A camera according to claim 8, wherein said inhibition means comprises means for inhibiting an opening operation of a camera body cover for allowing at least one of the loading operation and the unloading operation of a cartridge with respect to the camera.

10. An apparatus adapted to use a cartridge including an image recording medium, the cartridge having a cartridge cover that opens and closes to permit the image recording medium to exit from and withdraw into the cartridge, the apparatus comprising:

operation means for causing the cartridge cover of a cartridge loaded in the apparatus to open to an open state;

inhibition means for selectively inhibiting an unloading operation of the cartridge from the apparatus;

actuation means operable in a first state, in which operation of said actuation means simultaneously actuates said operation means to cause the cartridge cover to open to the open state and actuates said inhibition means to inhibit an unloading operation of the cartridge from the camera, and operable in a second state, in which such operation of said actuation means does not actuate said inhibition means; and state selection means for selecting operation of said actuation means in the first state or the second state.

11. An apparatus according to claim 10, wherein the image recording medium comprises a film.

12. An apparatus according to claim 10, wherein said inhibition means comprises means for inhibiting an opening operation of an apparatus body cover which allows the cartridge to be unloaded from the apparatus.

13. An apparatus according to claim 10, wherein said inhibition means comprises release means for releasing an operation of the inhibition means in connection with a closing operation of the cartridge cover of a cartridge loaded in the apparatus.

14. An apparatus according to claim 10, wherein said inhibition means comprises bias means for biasing said state selection means to select operation of said actuation means in the first state.

15. An apparatus according to claim 14, wherein said bias means includes a spring for biasing said disabling means in an inoperative state.

16. An apparatus according to claim 10, wherein the cartridge includes a first operation portion and a second operation portion functionally connected with the cartridge cover of the cartridge, the apparatus further comprising:

driving means for driving the first operation portion to selectively perform one of an opening operation and a closing operation of the cartridge cover of the cartridge, whereby a driving operation of said first operation portion by said driving means so as to selectively perform one of an opening operation and a closing operation of the cartridge cover of the cartridge thereby also causes a driving operation of the second operation portion so as to selectively perform one of an inhibiting operation and a release operation of the inhibition means, respectively.

17. An apparatus adapted to use a cartridge including an image recording medium, the cartridge having a cartridge cover that opens and closes to allow the image recording medium to exit from or withdraw into the cartridge, and having first and second operation portions functionally connected with respective ends of the cartridge cover, the apparatus comprising:

driving means for driving the first operation portion to selectively perform one of an opening operation and a closing operation of the cartridge cover of the cartridge;

inhibition means operable in a first state, for inhibiting at least one of a loading operation of a cartridge in the apparatus and an unloading operation of the cartridge from the apparatus, and operable in a second state, in which said inhibition means does not inhibit the loading operation or the unloading operation of the cartridge; and operation means, functionally connectable to said second operation portion, for performing a changeover operation between the first state and the second state of said inhibition means, whereby a driving operation of said first operation portion by said driving means so as to selectively perform one of an opening operation and a closing operation of the cartridge cover of the cartridge thereby also causes a driving operation of the second operation portion so as to selectively perform a changeover operation between the first state and the second state of said inhibition means, respectively.

18. An apparatus according to claim 17, wherein said inhibition means comprises means for inhibiting an opening operation of an apparatus body cover for allowing at least one of the loading operation and the unloading operation of a cartridge with respect to the apparatus.

19. An apparatus adapted to use a cartridge including an image recording medium, the cartridge having a light shield portion movable between an open state and a closed state to permit the image recording medium to exit from or withdraw into the cartridge, the apparatus comprising:

operation means for causing the light shield of a cartridge loaded in the apparatus to move to an open state;

inhibition means for selectively inhibiting an unloading operation of the cartridge from the apparatus when the light shield portion of a cartridge loaded in the apparatus is in the open state;

actuation means operable in a first state, in which operation of said actuation means simultaneously actuates said operation means to cause the light shield to move to the open state and actuates said inhibition means to inhibit an unloading operation of the cartridge from the apparatus, and operable in a second state, in which such operation of said actuation means does not actuate said inhibition means; and state selection means for selecting operation of said actuation means in the first state or the second state.

20. An apparatus according to claim 19, wherein the image recording medium comprises a film.

21. An apparatus according to claim 19, wherein said inhibition means comprises means for inhibiting an opening operation of an apparatus body cover which allows the cartridge to be unloaded from the apparatus.

22. An apparatus according to claim 19, wherein said inhibition means comprises release means for releasing an operation of said inhibition means in conjunction with a closing operation of the light shield portion of the cartridge loaded in the apparatus.

23. An apparatus according to claim 19, wherein said inhibition means comprises bias means for biasing said state selection means in the first state.

24. An apparatus according to claim 23, wherein said bias means includes a spring for biasing said disabling means in an inoperative state.

25. An apparatus according to claim 19, wherein the cartridge includes a first operation portion and a second operation portion functionally connected with the light shield portion of the cartridge, said apparatus further comprising:

driving means for driving the first operation portion to selectively perform one of an opening operation and a closing operation of the light shield portion of the cartridge, whereby a driving operation of said first operation portion by said driving means so as to selectively perform one of an opening operation and a closing operation of the cartridge cover of the cartridge thereby also causes a driving operation of the second operation portion so as to selectively perform one of an inhibiting operation and a release operation of the inhibition means, respectively.

26. An apparatus adapted to use a cartridge including an image recording medium, the cartridge having a light shield portion for shielding the image recording medium from external light and having first and second operation portions functionally connected with respective ends of the light shield portion, the apparatus comprising:

driving means for driving the first operation portion to selectively perform one of an opening operation and a closing operation of the light shield portion of the cartridge;

inhibition means operable in a first state, for inhibiting at least one of a loading operation of a cartridge in the apparatus and an unloading operation of a cartridge from the apparatus, and operable in a second state, in which said inhibition means does not inhibit a loading operation or an unloading operation of the cartridge; and operation means, functionally connectable to said second operation portion, for performing a changeover operation between the first state and the second state of said inhibition means, whereby a driving operation of said first operation portion by said driving means so as to selectively perform one of an opening operation and a closing operation of the light shield of the cartridge thereby also causes a driving operation of the second operation portion so as to selectively perform a changeover operation between the first state and the second state of said inhibition means, respectively.

27. An apparatus according to claim 26, wherein said inhibition means comprises means for inhibiting an opening operation of an apparatus body cover for allowing at least one of the loading operation and the unloading operation of a cartridge with respect to the apparatus.

28. A unit applied to at least one of a camera and an apparatus adapted to use a cartridge including an image recording medium, the cartridge having a light shield portion movable between an open state and a closed state to permit the image recording medium to exit from or withdrawn into the cartridge, the unit comprising:

operation means for causing the light shield of a cartridge loaded in the camera or apparatus to move to an open state;

inhibition means for selectively inhibiting an unloading operation of the cartridge from the unit when the light shield portion of a cartridge loaded in the camera or apparatus is in the open state; and actuation means operable in a first state, in which operation of said actuation means simultaneously actuates said operation means to cause the light shield to move to the open state and actuates said inhibition means to inhibit an unloading operation of the cartridge from the camera or apparatus, and operable in a second state, in which such operation of said actuation means does not actuate said inhibition means; and state selection means for selecting operation of said actuation means in the first state or the second state.

29. A unit according to claim 28, wherein the image recording medium comprises a film.

30. A unit according to claim 28, wherein said inhibition means comprises means for inhibiting an opening operation of a unit body cover which allows the cartridge to be unloaded from the camera or apparatus.

31. A unit according to claim 28, wherein said inhibition means comprises release means for releasing an operation of said inhibition means in conjunction with a closing operation of the light shield portion of the cartridge loaded in the camera or apparatus.

32. A unit according to claim 28, wherein said inhibition means comprises bias means for biasing said state selection means in the first state.

33. A unit according to claim 32, wherein said bias means includes a spring for biasing said disabling means in an inoperative state.

34. A unit according to claim 28, wherein the cartridge includes a first operation portion and a second operation portion functionally connected with respective ends of the light shield portion of the cartridge, said unit further comprising:

driving means for driving the first operation portion to selectively perform one of an opening operation and a closing operation of the light shield portion of the cartridge, whereby a driving operation of said first operation portion by said driving means so as to selectively perform one of an opening operation and a closing operation of the light shield of the cartridge thereby also causes a driving operation of the second operation portion so as to selectively perform one of an inhibiting operation and a release operation of the inhibition means, respectively.

35. A unit applied to at least one of a camera and an apparatus adapted to use a cartridge including an image recording medium, the cartridge having a light shield portion for shielding the image recording medium from external light and having first and second operation portions functionally connected with respective ends of the light shield portion, the unit comprising:

driving means for driving the first operation portion to selectively perform one of an opening operation and a closing operation of the light shield portion of the cartridge;

inhibition means operable in a first state, for inhibiting at least one of a loading operation of a cartridge in the camera or apparatus and an unloading operation of a cartridge from the camera or apparatus, and operable in a second state, in which said inhibition means does not inhibit a loading operation or an unloading operation of the cartridge; and operation means, functionally connectable to said second operation portion, for performing a changeover operation between the first state and the second state of said inhibition means;

whereby a driving operation of said first operation portion by said driving means so as to selectively perform one of an opening operation and a closing operation of the light shield of the cartridge thereby also causes a driving operation of the second operation portion so as to selectively perform a changeover operation between the first state and the second state of said inhibition means, respectively.

36. A unit according to claim 35, wherein said inhibition means comprises means for inhibiting an opening operation of a unit body cover for allowing at least one of the loading operation and the unloading operation of a cartridge with respect to the camera or apparatus.

37. A camera adapted to use a cartridge including an image recording medium, the cartridge having a cartridge cover and first and second operation portions functionally connected with respective ends of the cartridge cover, the camera comprising:

a drive device that drives the first operation portion to selectively perform one of an opening operation and a closing operation of the cartridge cover of the cartridge; and an operation member that performs a predetermined operation, said operation member being driven by a driving operation of the second operation portion, which is driven by the first operation portion driven by said drive device.

38. A camera according to claim 37, wherein said operation member comprises a prevention device that prevents at least one of a loading operation and an unloading operation of the cartridge with respect to the camera.

39. A camera according to claim 38, wherein said prevention device comprises a tab that prevents an opening of a camera body cover for allowing at least one of the loading operation and the unloading operation of a cartridge with respect to the camera.

40. An apparatus adapted to use a cartridge including an image recording medium, a first operation portion and a second operation portion functionally connected with respective ends of the cartridge cover of the cartridge, the apparatus comprising:

a prevention device that prevents a cartridge from being unloaded from the apparatus when a portion of the image recording medium is exited from the cartridge;

a disabling device that is selectively operable to disable an operation of said prevention device when a portion of the image recording medium is exited from the cartridge; and a driving device that drives the first operation portion to perform at least one of an opening operation and a closing operation of the cartridge cover of the cartridge, wherein said prevention device performs at least one of a prevention operation and a release operation of the prevention device in connection with a driving operation of the second operation portion driven by the first operation portion driven by said driving device.

41. An apparatus according to claim 40, wherein the image recording medium comprises a film.

42. An apparatus according to claim 40, wherein the cartridge comprises a cartridge cover functionally connected to the image recording medium for allowing the image recording medium to exit from the cartridge.

43. An apparatus according to claim 40, wherein said prevention device comprises a tab that prevents an opening operation of an apparatus body cover which allows the cartridge to be unloaded from the apparatus.

44. An apparatus according to claim 40, wherein said prevention device comprises a release device that releases the tab of the prevention device in connection with a closing operation of the cartridge cover of a cartridge loaded in the apparatus.

45. An apparatus according to claim 40, wherein said prevention device comprises means for functionally opposing said disabling device.

46. An apparatus adapted to use a cartridge including an image recording medium, the cartridge having a cartridge cover that opens and closes to permit the image recording medium to exit from or withdraw into the cartridge and having first and second operation portions functionally connected with respective ends of the cartridge cover, the apparatus comprising:

a driving device that drives the first operation portion to selectively perform one of an opening operation and a closing operation of the cartridge cover of the cartridge; and an operation member that performs a predetermined operation, said operation member being driven by a driving operation of the second operation portion, which is driven by the first operation portion driven by said driving device.

47. An apparatus according to claim 46, wherein said operation member comprises a prevention device that prevents at least one of a loading operation and an unloading operation of the cartridge with respect to the apparatus.

48. An apparatus according to claim 47, wherein said prevention device comprises a tab that prevents an opening operation of an apparatus body cover for allowing at least one of the loading operation and the unloading operation of a cartridge with respect to the apparatus.

49. An apparatus adapted to use a cartridge including an image recording medium, the cartridge further including a light shield portion movable between an open state and a closed state to permit an image recording medium to exit from or withdraw into the cartridge, a first operation portion and a second operation portion functionally connected with respective ends of the light shield portion, the apparatus comprising:

a prevention device that prevents a cartridge from being unloaded from the apparatus when the light shield portion of the cartridge loaded in the apparatus is open;

a disabling device that is selectively operable to disable an operation of said prevention device when the light shield portion of the cartridge loaded in the apparatus is open; and a driving device that drives the first operation portion to perform at least one of an opening operation and a closing operation of the light shield portion of the cartridge, wherein said prevention device comprises a tab that performs at least one of a prevention operation and a release operation of the prevention device in conjunction with a driving operation of the second operation portion driven by the first operation portion driven by said driving device.

50. An apparatus according to claim 49, wherein the image recording medium comprises a film.

51. An apparatus according to claim 49, wherein said prevention device comprises a tab that prevents an opening operation of an apparatus body cover which allows the cartridge to be unloaded from the apparatus.

52. An apparatus according to claim 49, wherein said prevention device comprises a release device that releases an operation of said prevention device in conjunction with a closing operation of the light shield portion of the cartridge loaded in the apparatus.

53. An apparatus according to claim 49, wherein said prevention device comprises means for functionally opposing said disabling device.

54. An apparatus adapted to use a cartridge including an image recording medium, the cartridge having a light shield portion for shielding the image recording medium from external light and having first and second operation portions functionally connected with respective ends of the light shield portion, the apparatus comprising:

a driving device that drives the first operation portion to selectively perform one of an opening operation and a closing operation of the light shield portion of the cartridge; and an operation member for performing a predetermined operation, said operation member being driven by a driving operation of the second operation portion, which is driven by the first operation portion driven by said driving device.

55. An apparatus according to claim 54, wherein said operation member comprises a prevention device that prevents at least one of a loading operation and an unloading operation of the cartridge with respect to the apparatus.

56. An apparatus according to claim 55, wherein said prevention device comprises a tab that prevents an opening operation of an apparatus body cover for allowing at least one of the loading operation and the unloading operation of a cartridge with respect to the apparatus.

57. A unit applied to at least one of a camera and an apparatus adapted to use a cartridge including an image recording medium, the cartridge further including a light shield portion movable between an open state and a closed state to permit the image recording medium to exit from or withdrawn into the cartridge, a first operation portion and a second operation portion functionally connected with respective ends of the light shield portion, the unit comprising:

a prevention device that prevents a cartridge from being unloaded from the unit when the light shield portion of the cartridge loaded in at least one of the camera and the apparatus is open;

a disabling device that is selectively operable to disable an operation of said prevention device when the light shield portion of the cartridge loaded in the at least one of the camera and the apparatus is open; and a driving device that drives the first operation portion to perform at least one of an opening operation and a closing operation of the light shield portion of the cartridge, wherein said prevention device comprises means for performing at least one of a preventing operation and a release operation of the prevention device in conjunction with a driving operation of the second operation portion driven by the first operation portion driven by said driving device.

58. A unit according to claim 57, wherein the image recording medium comprises a film.

59. A unit according to claim 57, wherein said prevention device comprises a tab that prevents an opening operation of a unit body cover which allows the cartridge to be unloaded from the at least one of the camera and the apparatus.

60. A unit according to claim 57, wherein said prevention device comprises a release device that releases an operation of said prevention device in conjunction with a closing operation of the light shield portion of the cartridge loaded in the at least one of the camera and the apparatus.

61. A unit according to claim 57, wherein said prevention device comprises means for functionally opposing said disabling device.

62. A unit applied to at least one of a camera and an apparatus adapted to use a cartridge including an image recording medium, the cartridge having a light shield portion for shielding the image recording medium from external light and having first and second operation portions functionally connected with respective ends of the light shield portion, the unit comprising:

a driving device that drives the first operation portion to selectively perform one of an opening operation and a closing operation of the light shield portion of the cartridge; and an operation member that performs a predetermined operation, said operation member being driven by a driving operation of the second operation portion, which is driven by the first operation portion driven by said driving device.

63. A unit according to claim 62, wherein said operation member comprises a prevention device that prevents at least one of a loading operation and an unloading operation of the cartridge with respect to the at least one of the camera and the apparatus.

64. A unit according to claim 63, wherein said prevention device comprises a tab that prevents an opening operation of a unit body cover for allowing at least one of the loading operation and the unloading operation of a cartridge with respect to the at least one of the camera and the apparatus.

* * * * *

UNITED STATES PATENT AND TRADEMARK OFFICE
CERTIFICATE OF CORRECTION

PATENT NO. : 6,220,770 B1
DATED : April 24, 2001
INVENTOR(S) : Hiroshi Sakurai

It is certified that error appears in the above-identified patent and that said Letters Patent is hereby corrected as shown below:

Column 1,
Line 52, "cartridge" should read -- when the cover of the cartridge --.

Column 6,
Line 48, "mode" should read -- mode of --.

Column 10,
Line 59, "withdrawn" should read -- withdraw --.

Column 14,
Line 36, "withdrawn" should read -- withdraw --.

Signed and Sealed this

Nineteenth Day of February, 2002

Attest:

JAMES E. ROGAN
Attesting Officer
Director of the United States Patent and Trademark Office